(12) United States Patent
Alfiad et al.

(10) Patent No.: US 9,729,244 B2
(45) Date of Patent: Aug. 8, 2017

(54) APPARATUS AND METHOD FOR MONITORING SIGNAL QUALITY OF A MODULATED OPTICAL SIGNAL

(71) Applicant: ADVA Optical Networking SE, Meiningen (DE)

(72) Inventors: Mohammad Alfiad, Duluth, GA (US); Sorin Tibuleac, Johns Creek, GA (US)

(73) Assignee: ADVA Optical Networking SE, Meiningen (DE)

( * ) Notice: Subject to any disclaimer, the term of this patent is extended or adjusted under 35 U.S.C. 154(b) by 86 days.

(21) Appl. No.: 14/518,262

(22) Filed: Oct. 20, 2014

(65) Prior Publication Data

US 2016/0112138 A1    Apr. 21, 2016

(51) Int. Cl.
*H04B 10/588* (2013.01)
*H04B 10/50* (2013.01)
*H04B 10/61* (2013.01)

(52) U.S. Cl.
CPC . *H04B 10/50572* (2013.01); *H04B 10/50575* (2013.01); *H04B 10/50593* (2013.01); *H04B 10/50595* (2013.01); *H04B 10/588* (2013.01); *H04B 10/615* (2013.01)

(58) Field of Classification Search
CPC .................................................. H04B 10/588
See application file for complete search history.

(56) References Cited

U.S. PATENT DOCUMENTS

| | | | |
|---|---|---|---|
| 5,710,653 A | 1/1998 | Nemecek et al. | |
| 7,330,666 B1 * | 2/2008 | Koley | H04B 10/505 398/188 |
| 8,131,148 B2 | 3/2012 | Sun et al. | |
| 8,406,638 B2 | 3/2013 | Hoshida | |
| 8,433,192 B2 | 4/2013 | Frankel et al. | |
| 2010/0158538 A1 * | 6/2010 | Mazzini | H04B 10/58 398/182 |

(Continued)

FOREIGN PATENT DOCUMENTS

| | | | |
|---|---|---|---|
| CA | 2719383 A1 | 4/2012 | |
| CN | 103728740 A * | 4/2014 | G02F 1/01 |

(Continued)

OTHER PUBLICATIONS

Extended European Search Report corresponding to European application No. 15164451.5, dated Apr. 3, 2016, (10 pages).

(Continued)

*Primary Examiner* — Nathan Curs
(74) *Attorney, Agent, or Firm* — Maginot, Moore & Beck, LLP

(57) ABSTRACT

A transmitter with at least one optical modulator adapted to modulate the optical signal output by a laser source to generate a modulated optical signal, wherein the optical signal output by the laser source is tapped and supplied to a monitoring circuit comprising an optical front end configured to select signal components of the tapped modulated optical signal and to convert the selected signal components of the tapped modulated optical signal into analog signals, and comprising at least one analog-to-digital converter, ADC, adapted to perform equivalent-time sampling of the analog signals to provide digital signals processed by a processing unit to monitor signal quality of the modulated optical signal.

18 Claims, 9 Drawing Sheets

(56) References Cited

U.S. PATENT DOCUMENTS

2011/0129232 A1    6/2011   Dou et al.
2015/0180570 A1*   6/2015   Malouin .......... H04B 10/07955
                                                                       398/25

FOREIGN PATENT DOCUMENTS

| CN | 103728740 A   | 4/2014  |
|----|---------------|---------|
| EP | 2 672 638 A1  | 12/2013 |
| WO | 2010095039 A3 | 8/2010  |
| WO | 2012163419 A1 | 12/2012 |

OTHER PUBLICATIONS

Agilent Technologies, Inc., "What is the difference between an equivalent time sampling oscilloscope and a real-time oscilloscope?" Nov. 18, 2013, (8 pages).

\* cited by examiner

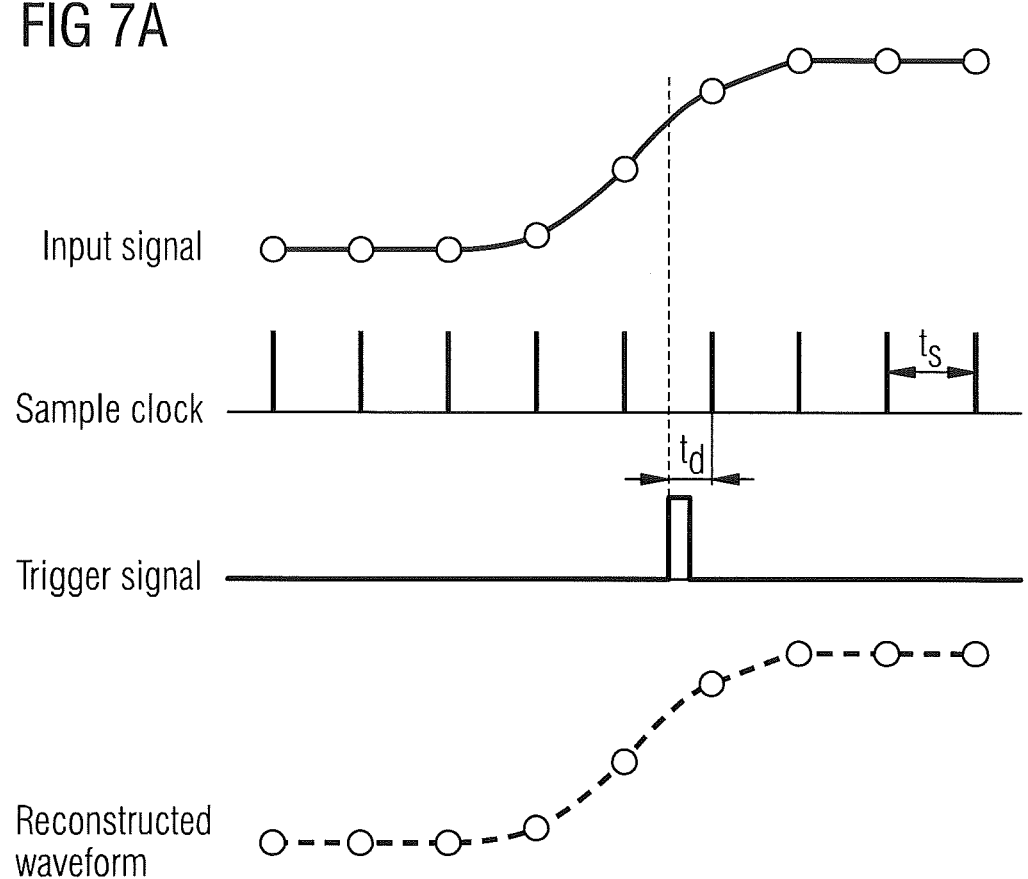

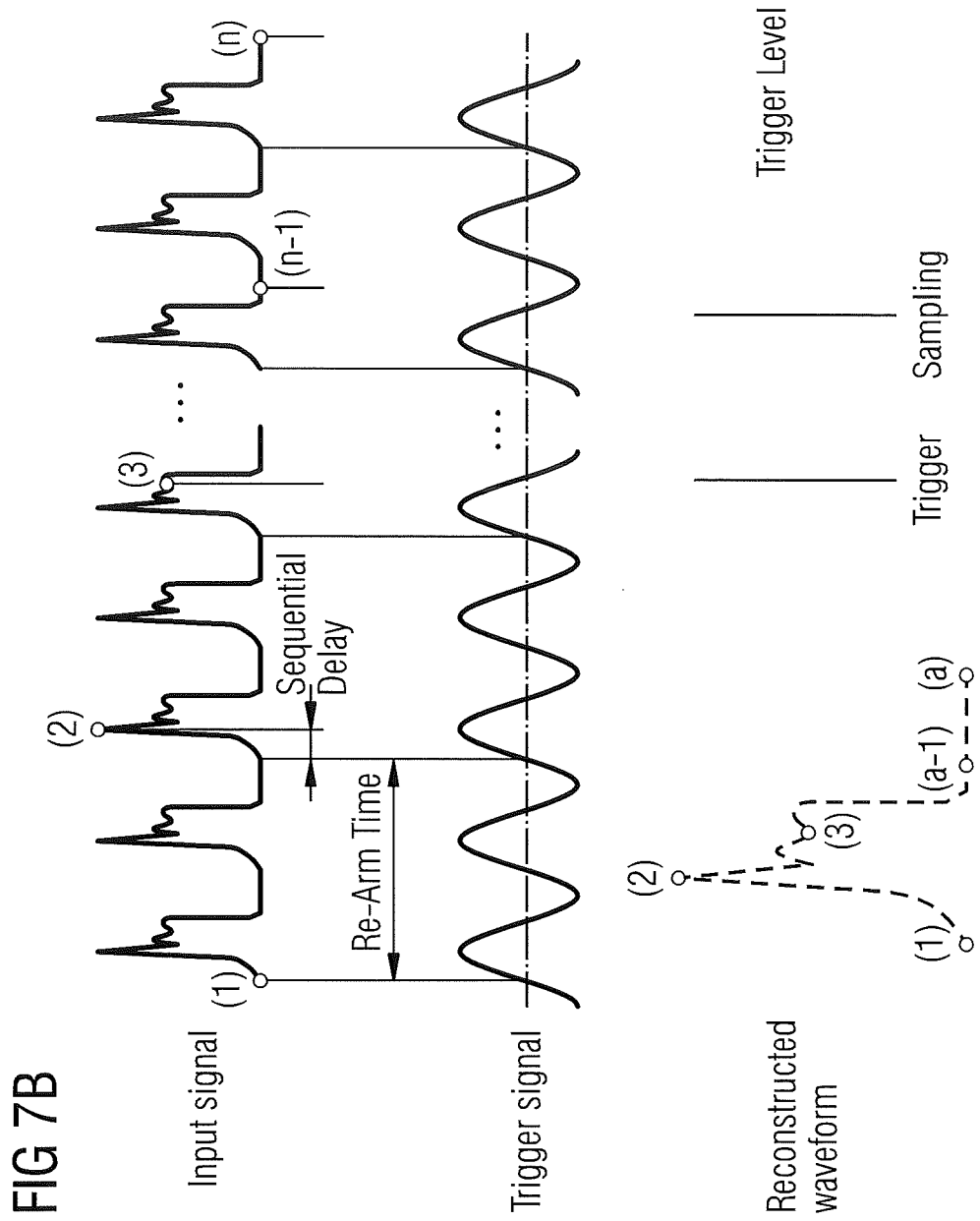

Real-Time

Equivalent-Time

Real-Time

Equivalent-Time

APPARATUS AND METHOD FOR MONITORING SIGNAL QUALITY OF A MODULATED OPTICAL SIGNAL

BACKGROUND

This invention relates to an optical transmitter and to a method for monitoring signal quality of a modulated optical signal output by a transmitter.

In optical communication systems, the demand for more bandwidth forces the increase in the data rates of the optical channels used in the backbone of optical communication systems. The increase of data rates has until now been achieved mainly by increasing the order of the modulation format of the optical channels. Upgrading the order of the modulation format for the optical channels has so far been straightforward due to the fact that only binary electrical driving signals have been utilized in optical transmitters of the communication system. In order to increase the spectral efficiency one can make use of multilevel modulation formats together with polarization division multiplexing such as 16 quadrature amplitude modulation 16QAM, 32 quadrature amplitude modulation 32QAM and even 64 quadrature amplitude modulation 64QAM. However, multilevel modulation requires larger optical signal-to-noise ratios and is more sensitive to nonlinear propagation impairments and laser phase noise. Further, the transmitter, having an optical modulator to generate the modulated optical signal and the respective modulation format, comprises transmitter components with nonlinear transfer functions so that pre-distortion is required. For example, a conventional optical transmitter can comprise Mach-Zehnder modulators MZM which have nonlinear transfer functions. This is illustrated with respect to FIGS. 1a, 1b. FIG. 1a shows the effect using a $2V_\pi$ driving signal and FIG. 1b shows the effect using a $2V_\pi$ driving signal with pre-distortion. According to FIG. 1, driving the Mach-Zehnder modulators at the optical transmitter with conventional 4PAM signals does not guarantee the generation of high-quality optical 16QAM signals so that some form of pre-distortion is required. This pre-distortion becomes even more critical when moving further towards higher-density modulation formats such as PDM-16QAM or PDM-64QAM. Furthermore, pre-distortion is beneficial for overcoming any penalties arising from the implementation of InP or Si photonic circuits in the optical system.

Accordingly, there is a need for effectively monitoring the signal quality of a modulated optical signal having a high order modulation format.

SUMMARY OF THE DISCLOSURE

According to a first aspect, the invention provides a transmitter with at least one optical modulator adapted to modulate the optical signal output by a laser source to generate a modulated optical signal, wherein the optical signal output by the laser source is tapped and supplied as a reference to a monitoring circuit comprising:

an optical front end configured to select signal components of the tapped modulated optical signal and to convert the selected signal components of the tapped modulated optical signal into analog signals, and comprising at least one analog-to-digital converter adapted to perform equivalent-time or asynchronous sampling of the analog signals to provide digital signals processed by a processing unit to monitor signal quality of the modulated optical signal.

In a possible embodiment of the transmitter according to the first aspect of the present invention, the optical modulator is configured to modulate an amplitude and/or a phase and/or a polarization of the optical signal output by said laser source to generate the modulated optical signal output by the transmitter.

In a still further possible embodiment of the transmitter according to the first aspect of the present invention, the processing unit of the monitoring circuit comprises a digital signal processor adapted to calculate an optimal pre-distortion function and/or correction parameters to be used by the transmitter to compensate for transmitter impairments, in particular for nonlinear transfer functions and/or bandwidth limitations of transmitter components.

These correction parameters can for instance be related to the IQ-imbalance (the amount of power imbalance at the transmitted between I and Q), IQ-skew (measure how much is the delay between the I and Q components and request the transmitter to correct for that) and the DC bias voltages used for the optical modulator In a still further possible embodiment of the transmitter according to the first aspect of the present invention, the monitoring circuit supplies a feedback control signal to adjust driving signals applied to the optical modulator according to the calculated pre-distortion function and/or correction parameters.

In a further possible embodiment of the transmitter according to the first aspect of the present invention, the optical front end of the monitoring circuit is configured to dissolve signal components of the modulated optical signal via optical coherent detection, wherein the signal components comprise an in-phase component in a horizontal or vertical polarization state and a quadrature component in a horizontal or vertical polarization state.

In a further possible embodiment of the transmitter according to the first aspect of the present invention, the calculated optimal pre-distortion function is continuously adjusted by the monitoring circuit to compensate changes of characteristics of transmitter components due to time-dependent variations of operation parameters and/or aging of transmitter components.

In a still further possible embodiment of the transmitter according to the first aspect of the present invention, the unmodulated optical signal output by the laser source is tapped by a first polarization maintaining coupler and supplied as a reference signal to the optical front end of the monitoring circuit.

In a still further possible embodiment of the transmitter according to the first aspect of the present invention, the modulated optical signal output by the optical modulator is tapped by a second polarization maintaining coupler and supplied to the optical front end of the monitoring circuit.

In a still further possible embodiment of the transmitter according to the first aspect of the present invention, the unmodulated optical signal tapped by the first polarization maintaining coupler is supplied as a reference signal to a first polarization beam splitter of the optical front end and the modulated optical signal tapped by the second polarization maintaining coupler is supplied to a second polarization beam splitter of the optical front end.

In a still further possible embodiment of the transmitter according to the first aspect of the present invention, a first split signal output by the first polarization beam splitter is supplied to a first input of a first 90-degree hybrid coupler of the optical front end and a second split signal output by the first polarization beam splitter is supplied to a second input of a second 90-degree hybrid coupler of the optical front end, and wherein a first split signal output by the second polarization beam splitter is supplied to a second input of the first 90-degree hybrid coupler of the optical front end and the second split signal output by the second polarization beam splitter is supplied to the first input of the second 90-degree hybrid coupler of the optical front end.

In a further possible embodiment of the transmitter according to the first aspect of the present invention, the first 90-degree hybrid coupler of the optical front end outputs an in-phase signal component and a quadrature signal component in a first polarization state to two corresponding photo detectors converting both optical signal components into corresponding analog signals and wherein the second 90-degree hybrid coupler of the optical front end outputs an in-phase signal component and a quadrature signal component in a second polarization state to two photo detectors converting both optical signal components into corresponding analog signals.

In a further possible embodiment of the transmitter according to the first aspect of the present invention, the analog signals provided by the four photo detectors of the optical front end are applied to four analog-to-digital converters to perform equivalent time sampling of the received analog signals to provide digital signals processed by the processing unit of the monitoring circuit.

In a still further possible embodiment of the transmitter according to the first aspect of the present invention, the unmodulated optical signal tapped by the first polarization maintaining coupler is supplied as a reference signal to a polarization rotator of the optical front end configured to rotate the polarization axis of the tapped unmodulated optical signal by either 0 or 90 degrees. This embodiment has the advantage that the number of optical and RF components can be reduced.

In a further possible embodiment of the transmitter according to the first aspect of the present invention, the rotated tapped unmodulated optical signal output by the polarization rotator is supplied to a first input of a 90-degree hybrid coupler of the optical front end and the tapped modulated optical signal output by the second polarization maintaining coupler is supplied to a second input of said 90-degree hybrid coupler which outputs an in-phase signal component and a quadrature signal component in a selected polarization state to two photo detectors converting the optical signals to analog signals applied to two analog-to-digital converters adapted to perform equivalent-time sampling of the received analog signals to provide digital signals processed by the processing unit of the monitoring circuit.

In a still further possible embodiment of the transmitter according to the first aspect of the present invention, the unmodulated optical signal tapped by the first polarization maintaining coupler is supplied as a reference signal to a polarization rotator and a phase shifter of the optical front end configured to rotate the polarization axis of the tapped unmodulated optical signal by either 0 degrees or 90 degrees and to shift simultaneously the optical phase of the tapped unmodulated signal by either 0 or 90 degrees.

In a further possible embodiment of the transmitter according to the first aspect of the present invention, the rotated unmodulated optical signal output by the polarization rotator and phase shifter is mixed by means of an optical coupler with the modulated optical signal tapped by the second polarization maintaining coupler and supplied to a single photo detector of the optical front end converting the mixed optical signal to an analog signal applied to a single analog-to-digital converter adapted to perform equivalent-time sampling of the received analog signal to provide a corresponding digital signal processed by the processing unit of the monitoring circuit.

In a still further possible embodiment of the transmitter according to the first aspect of the present invention, the analog-to-digital converters are triggered by a trigger circuit clocked by a clock signal having a reduced clock rate being smaller than the clock rate of the optical modulator.

In a still further possible embodiment of the transmitter according to the first aspect of the present invention, the processing unit of the monitoring circuit is a digital signal processor DSP operated at a reduced clock rate being smaller than the clock rate of the optical modulator.

In a further possible embodiment of the transmitter according to the first aspect of the present invention, the processing unit comprises being configured to construct a transfer function of the transmitter used to calculate an optimal pre-distortion function to be used by the transmitter.

In a still further possible embodiment of the transmitter according to the first aspect of the present invention, the monitoring circuit comprises an interface to report parameters related to the monitored signal quality of the modulated optical signal output by the transmitter. The parameters can be reported to a network operator to provide feedback on the quality of the transmitted signal.

In a still further possible embodiment of the transmitter according to the first aspect of the present invention, the optical modulator can comprise at least one Mach-Zehnder modulator MZM.

In a further possible embodiment of the transmitter according to the first aspect of the present invention, the modulated optical signal output by the transmitter is an optical polarization division multiplexed, PDM, quadrature amplitude modulation, QAM, signal.

In a further possible embodiment of the transmitter according to the first aspect of the present invention, the modulated optical signal output by the transmitter comprises a data rate of more than 25 Gigabit/sec.

In a possible embodiment of the transmitter according to the first aspect of the present invention the hybrid couplers of the optical front end comprise 90-degree hybrid couplers or 120 degree hybrid couplers.

The invention further provides according to a second aspect a method for monitoring signal quality of a modulated optical signal output by a transmitter, the method comprising:

switching continuously between different optical signal components of the modulated optical signal to extract the optical signal components, converting the extracted optical signal components into electrical analog signals, performing equivalent-time sampling of the converted analog signals to provide corresponding low-rate digital signals and processing the low-rate digital signals to monitor the signal quality of the modulated optical signal.

The invention further provides according to a third aspect an optical communication system comprising at least one transmitter transmitting a modulated optical signal via an optical transport medium to a receiver, wherein the at least one transmitter comprises at least one optical modulator adapted to modulate the optical signal output by a laser source to generate a modulated optical signal, wherein the optical signal output by the laser source is tapped and supplied to a monitoring circuit of the transmitter, said monitoring circuit comprising:

an optical front end configured to select signal components of the tapped modulated optical signal and to convert the selected signal components of the tapped modulated optical signal into analog signals, and at least one analog-to-digital converter adapted to perform equivalent-time sampling of the analog signals to provide digital signals processed by a processing unit to monitor the signal quality of the modulated optical signal.

DESCRIPTION OF THE DRAWINGS

The present invention is illustrated and described herein with reference to the various drawings in which like reference numbers are used to denote like system components and/or method steps, as appropriate, and in which:

FIGS. 7a, 7b show signal diagrams for illustrating the process of equivalent-time sampling employed by the transmitter and method according to the present invention;

DETAILED DESCRIPTION

Figure 2:
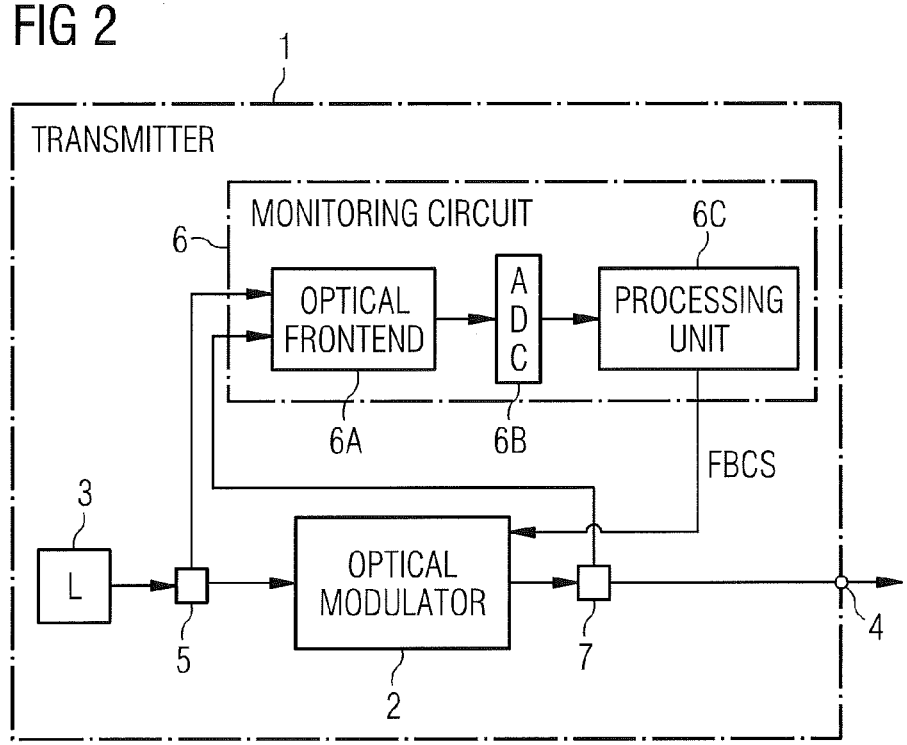
FIG. 2 shows a block diagram for illustrating a possible exemplary embodiment of a transmitter according to the first aspect of the present invention.

FIG. 2 illustrates an exemplary embodiment of a transmitter 1 according to the first aspect of the present invention. The transmitter 1 comprises an optical modulator 2 adapted to modulate the optical signal output by a laser source 3 to generate a modulated optical signal output at a signal output 4 of the transmitter 1. The optical signal output by the laser source 3 is tapped by means of a first polarization maintaining coupler 5 and supplied as a reference signal to a monitoring unit 6 of the transmitter 1. The polarization maintaining coupler 5 taps off a portion of the transmitter laser power and supplies a corresponding reference signal to an optical front end 6A of the monitoring unit 6 as illustrated in FIG. 2. The modulated optical signal output by the optical modulator 2 is tapped by means of a second polarization maintaining coupler 7 and also supplied to the optical front end 6A of the monitoring unit 6 as shown in FIG. 2. The optical front end 6A of the monitoring unit 6 is configured to dissolve signal components of the tapped modulated optical signal, via optical coherent detection, and to convert the selected signal components of the tapped modulated optical signal into analog signals. These analog signals are supplied to corresponding analog-to-digital converters ADC 6B to provide digital signals processed by a processing unit 6C of the monitoring unit 6 to monitor the signal quality of the modulated optical signal output by the transmitter 1.

Figure 1A:
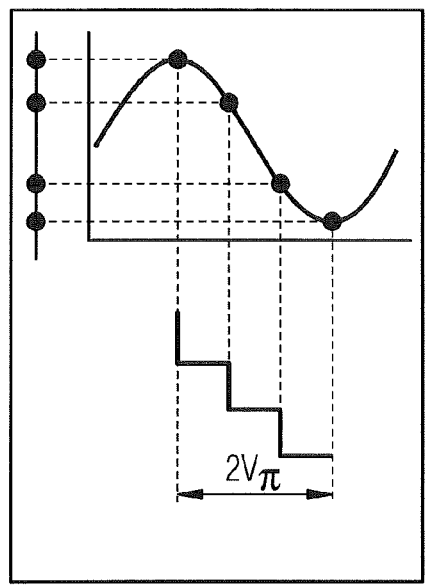
FIGS. 1a, 1b show signal diagrams for illustrating a problem underlying the present invention.
Figure 1B:
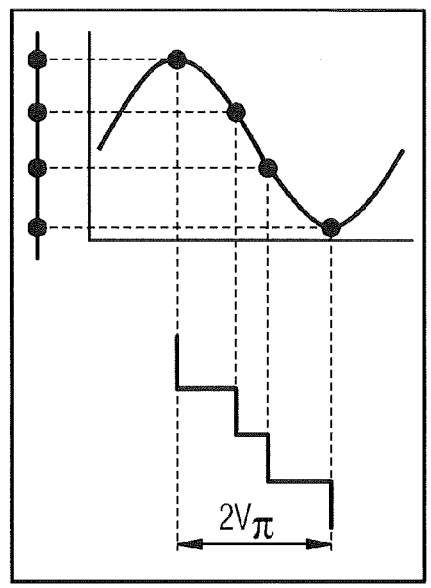

The optical modulator 2 of the transmitter 1 is configured to modulate an amplitude and/or a phase and/or a polarization of the optical signal output by the laser source 3 to generate the modulated optical signal output by the transmitter 1. In a possible exemplary embodiment, the optical modulator 2 can comprise one or several Mach-Zehnder modulators MZM having nonlinear transfer functions as illustrated in FIGS. 1a, 1b. However, a Mach-Zehnder modulator MZM forming a component of the transmitter has a nonlinear transfer function which degrades the quality of the modulated optical signal output by the optical modulator 2. In a possible embodiment, the monitoring unit 6 of the transmitter 1 is configured to compensate for impairments of transmitter components, in particular to a nonlinear transfer function of a MZM modulator used in the optical modulator 2 and/or the nonlinearity of other transmitter components such as driving amplifiers. In a possible embodiment of the transmitter 1, the processing unit 6C of the monitoring circuit 6 comprises a digital signal processor DSP adapted to calculate an optimal pre-distortion function to be used by the transmitter 1 to compensate for nonlinear transfer functions and/or bandwidth limitations of transmitter components. In a possible embodiment, the monitoring circuit 6 supplies a feedback control signal FBCS to adjust driving signals applied to the optical modulator 2 according to the calculated pre-distortion function. As can be seen in FIG. 2, the monitoring circuit 6 is attached or integrated in the transmitter 1 to monitor the signal quality of its output signal. Accordingly, the optical modulator 2 is adjusted on the basis of a feedback control signal FBCS generated on the transmitter side and does not rely on a feedback from the receiver side. Consequently, a time delay for sending a feedback control signal from a receiver to the transmission side is avoided. Another reason for the receiver feedback not being useful is because the received signal will be degraded with some impairment that are taking place in the transmission link. Therefore, a reliable pre-distortion function or correction parameters cannot be accurately calculated.

The optical front end 6A of the monitoring circuit 6 is configured to dissolve signal components of the modulated optical signal, wherein the signal components can comprise an in-phase component I in a horizontal and/or vertical polarization state and a quadrature component Q in a horizontal and/or vertical polarization state. With the monitoring circuit 6 of the transmitter 1, the calculated optimal pre-distortion function can be continuously adjusted by the monitoring circuit 6 to compensate changes of characteristics of transmitter components due to time-dependent variations of operation parameters and/or aging of transmitter components. In a possible embodiment, the processing circuit 6 can further comprise a data interface to record parameters related to the monitored signal quality of the modulated optical signal output by the transmitter 1 to a network operator. In a possible embodiment of the modulated optical signal output by the transmitter 1, the signal output 4 is a polarization division multiplexed PDM, quadrature amplitude modulation QAM, signal. In a possible exemplary embodiment, the modulated optical signal output by the transmitter 1 is a PDM-16QAM signal, a PDM-32QAM signal or a PDM-64QAM signal. In a possible embodiment of the transmitter 1, the data rate of the data stream output by the transmitter 1 comprises a data rate of more than 25 Gigabit/sec. In a possible embodiment, the modulated optical signal output by the transmitter 1 comprises a data rate of even more than 100 Gigabit/sec. The transmission apparatus can comprise several transmitters 1 as shown in FIG. 2 to send several data streams in parallel each having a data rate of more than or equal 25 Gigabit/sec.

Figure 3:
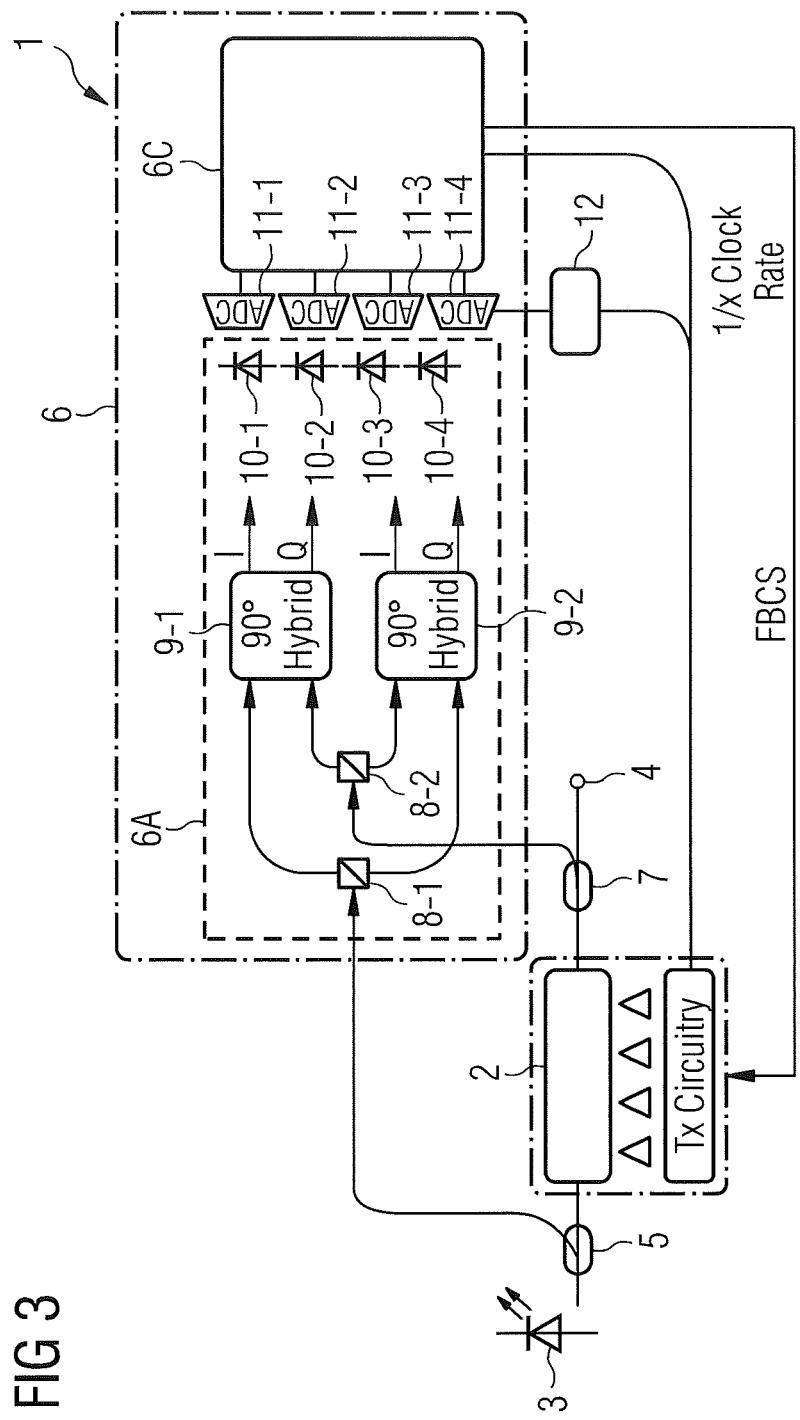
FIG. 3 shows a block diagram for illustrating a possible exemplary embodiment of a transmitter according to the first aspect of the present invention.

FIG. 3 shows a first exemplary embodiment of a transmitter 1 according to the present invention. In the illustrated embodiment, the unmodulated optical signal output by the laser source 3 is tapped by a first polarization maintaining coupler 5 and supplied as a reference signal to a first polarization beam splitter 8-1 of the optical front end 6A and the modulated optical signal tapped by the second polarization maintaining coupler 7 is supplied to a second polarization beam splitter 8-2 of the optical front end 6A. The first split signal output by the first polarization beam splitter 8-1 is supplied to a first input of a first 90-degree hybrid coupler 9-1 and a second split signal output by the first polarization beam splitter 8-1 is supplied to a second input of a second 90-degree hybrid coupler 9-2 as illustrated in FIG. 3. Similar, a first split signal output by the second polarization beam splitter 8-2 is supplied to a second input of the first 90-degree hybrid coupler 9-1 and the second split signal output by the second polarization beam splitter 8-2 is supplied to the first input of the second 90-degree hybrid coupler 9-2. The first 90-degree hybrid coupler 9-1 of the optical front end 6A outputs an in-phase signal component I and a quadrature signal component Q in a first polarization state to two corresponding photo detectors or photo diodes 10-1, 10-2 converting the two received optical signal components in corresponding analog electrical signals applied to corresponding low speed analog-to-digital converters 11-1, 11-2. Similar, the second 90-degree hybrid coupler 9-2 outputs also an in-phase signal component I and a quadrature signal component Q in a second polarization state to two corresponding photo detectors or photo diodes 10-3, 10-4 converting the received optical signal components into corresponding electrical analog signals applied to corresponding low speed analog-to-digital converters 11-3, 11-4. The four analog signals provided by the four photo detectors 10-1, 10-2, 10-3, 10-4 of the optical front end 6A are applied to the four analog-to-digital converters 11-1, 11-2, 11-3, 11-4 which are adapted to perform an equivalent-time sampling of the received analog signals to provide corresponding digital signals processed by the processing unit 6C of the monitoring circuit 6. The analog-to-digital converters 11-1, 11-2, 11-3, 11-4 form the ADC converting stage 6B of the monitoring circuit 6. The analog-to-digital converters 11-i is triggered by a trigger circuit 12 as shown in FIG. 3. The processing unit 6C is formed in a preferred embodiment by a low speed digital signal processor DSP which is adapted to calculate an optimal pre-distortion function to be used by the transmitter 1 to compensate for nonlinear transfer functions and/or bandwidth limitations of the transmitter components or any other impairment including IQ offset or power imbalance. The analog-to-digital converters 11-i of the ADC converting stage 6B are triggered by the trigger circuit 12 in a preferred embodiment by a clock signal having a reduced clock rate being smaller than the clock rate of the optical modulator 2. Also, the low-speed DSP of the processing unit 6C is operated in a preferred embodiment with the reduced clock rate being smaller than the clock rate of the optical modulator 2.

Figure 10:
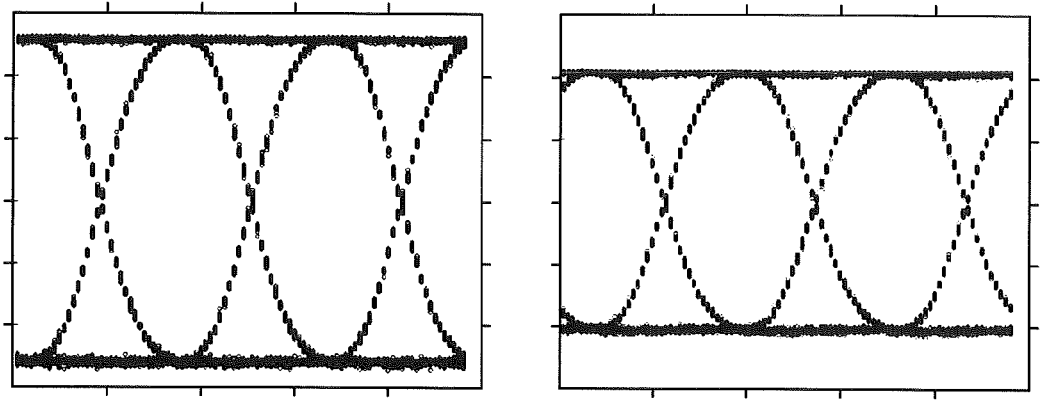
FIGS. 10,11,12 show diagrams for illustrating the operation of an exemplary embodiment of the method and apparatus according to the present invention.
Figure 11:
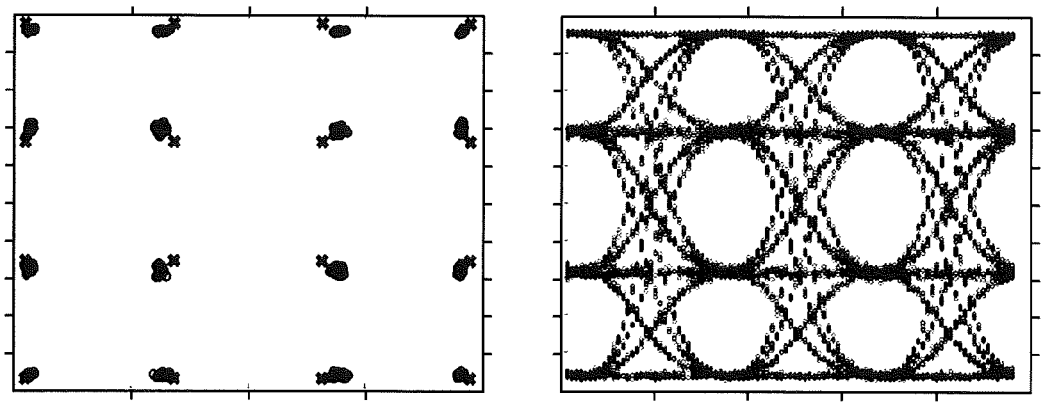
Figure 12:
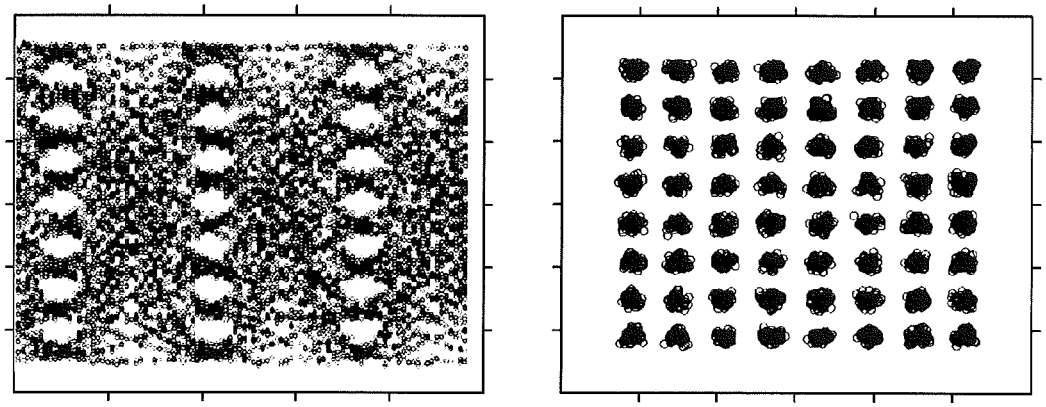
Figure 13:
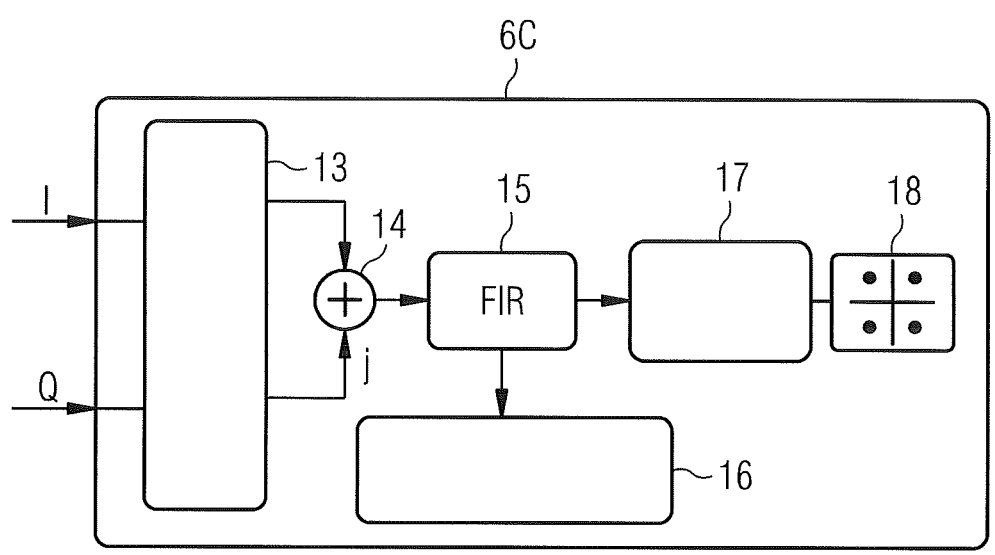
FIG. 13 shows a block diagram of an exemplary embodiment of a processing unit within a monitoring circuit used in a transmitter according to an aspect of the present invention.

FIG. 13 shows a block diagram of a possible exemplary embodiment of a processing unit 6C of the monitoring circuit 6 using a low-speed digital signal processor DSP to monitor the signal quality of the modulated optical signal. The processing unit 6C comprises a measuring unit 13 to measure an IQ power imbalance between the in-phase signal component I and the quadrature phase signal component Q received from the optical front end 6A and converted by the ADC conversion stage 6B. In a possible embodiment, the measuring unit 13 measures the power difference and time delay between the in-phase and quadrature phase signal components of the received signals. Different DSP blocks can for instance calculate the IQ imbalance and IQ skew. These blocks can also construct the constellation and eye diagrams. Furthermore, they use the constructed constellation diagrams to find out about any deformation in the constellation diagram (i.e. constellation points shifted from their original location due to nonlinearities in the transmitter or other impairments). FIG. 10 shows how a 2 dB power imbalance and 5 ps skew between in-phase and quadrature signal components can be inferred from the measured eye diagrams. The processing unit 6C having a low-speed digital signal processor, DSP, can also reveal the effect of nonlinear transfer functions of Mach-Zehnder modulators MZMs or driver amplifiers on distorting the constellation points in high-order optical modulation formats by examining the uniformity of the in-phase I and quadrature phase Q multi-level eye diagrams as illustrated in FIG. 11. The low-speed digital signal processor DSP of the processing unit 6C can comprise an adder 14 adding the in-phase and quadrature signal components and supplying the complex signal to a finite impulse response filter FIR 15 which is adapted to construct a transfer function of the transmitter 1 using filter taps, wherein the constructed transfer function can be stored in a data memory 16. The constructed transfer function of the transmitter 1 can be further used to calculate an optimal pre-distortion function to be used by the transmitter 1 and to generate corresponding feedback control signals FBCS supplied to the optical modulator 2 and possibly to other transmitter components of the transmitter 1. The output signal of the FIR filter 15 can be supplied to a slow phase recovery circuit 17 and to a calculation unit 18 adapted to calculate or construct a constellation diagram of the modulated optical output signal as shown in FIG. 11 illustrating a constellation diagram on the left and a corresponding signal diagram on the right side. The FIR filter 15 of the processing unit 6C is in a possible embodiment implemented to equalize the received signal and subsequently utilize its taps to construct the transfer function of the transmitter 1 stored temporarily in the memory 16. The calculated transfer function can be used to calculate a pre-emphasis or a pre-distortion function to be employed at the transmitter 1. Such a pre-emphasis function helps to overcome excess penalties from the transmitter's bandwidth limitations and/or correct imperfect Nyquist spectral shaping. The advantage of this pre-emphasis can be substantial due to the sensitivity of high-order modulation formats to bandwidth limitations. FIG. 12 demonstrates the effect of limiting the bandwidth of a 64QAM-transmitter to 17 GHz which is the bandwidth of conventional digital-to-analog converters commercially available today.

The digital signal processor DSP of the processing unit 6 as shown in FIG. 13 can comprise a data interface to report parameters related to the monitored signal quality of the modulated optical signal output by the transmitter 1 comprising but not restricted to a signal-to-noise ratio SNR, a Q-factor, an error vector magnitude EVM and/or polarization dependent loss PDL. The report output by the data interface of the monitoring circuit 6 can be supplied to a central control unit of a network operator for performing troubleshooting in the optical communication network. The signal quality report provides the user with a better overview of the performance of the transmitter 1 which has been limited so far to only simple parameters such as temperature and transmitted power. In a still further possible embodiment, the processing unit 6C can also report a reconstructed constellation diagram as shown for instance in FIG. 12 on the right side and/or corresponding signal eye diagrams to the user or operator of the communication network. For instance, if a network operator observes problems from a received signal at a receiver, he can investigate the reported signal quality parameters received from the monitoring circuit 6 of the transmitter 1 and even download in a possible embodiment on request the constructed constellation diagram and/or signal eye diagrams of the modulated optical signal transmitted by the transmitter 1. In this way, the operator can narrow down the entities of the system that may cause the problems observed on the receiver side.

As can be seen from the block diagram in FIG. 13, the digital signal processor DSP of the processing unit 6C within the monitoring circuit 6 does not require a carrier recovery block due to the fact that a self-homodyne receiver structure is employed. With self-homodyne detection, no frequency recovery is required. Furthermore, the optical modulator 2 and the monitoring circuit 6 are sharing the same clock source so that no clock recovery is required. Further, this simplifies the circuit structure of the employed digital signal processor DSP of the processing unit 6C. With the components of the optical front end 6A and the tapping entities, the polarization state of the optical signals is preserved and no multi-input multi-output MIMO processing is required to decouple polarization states. Accordingly, a further simplification of the DSP comes from the lack of MIMO processing, given that no crosstalk is expected to take place between two signal polarizations at the output of the transmitter 1. Accordingly, the low-speed DSP of the processing unit 6C does not require any clock recovery, no carrier recovery, and no MIMO equalization, so that the complexity of the low-speed DSP running at a low clock rate is not high. The DSP shown in FIG. 3 can run at a low clock rate since the analog-to-digital converters 11-i of the ADC converting stage 6B form a very low-speed equivalent-time sampling to characterize the signal at the output of the transmitter 1. As shown with respect to FIGS. 7a, 7b, an equivalent-time sampling of an input signal is used for performance characterization rather than detection. FIG. 7b shows equivalent-time sampling versus real-time sampling as illustrated in FIG. 7a. By employing equivalent-time sampling one can use substantially lower-speed analog-to-digital converters ADCs compared to the analog-to-digital converters required for real-time sampling. Additionally, equivalent-time sampling offers significantly higher effective bandwidths compared to real-time sampling and a much better vertical resolution. As a result, equivalent-time sampling has a better characterization of signals at a fraction of the effort of real-time sampling. The viability of applying equivalent-time sampling together with the simplified optical front end structure depicted in the embodiment of FIG. 5 has been carried out via simulations.

Figure 8:
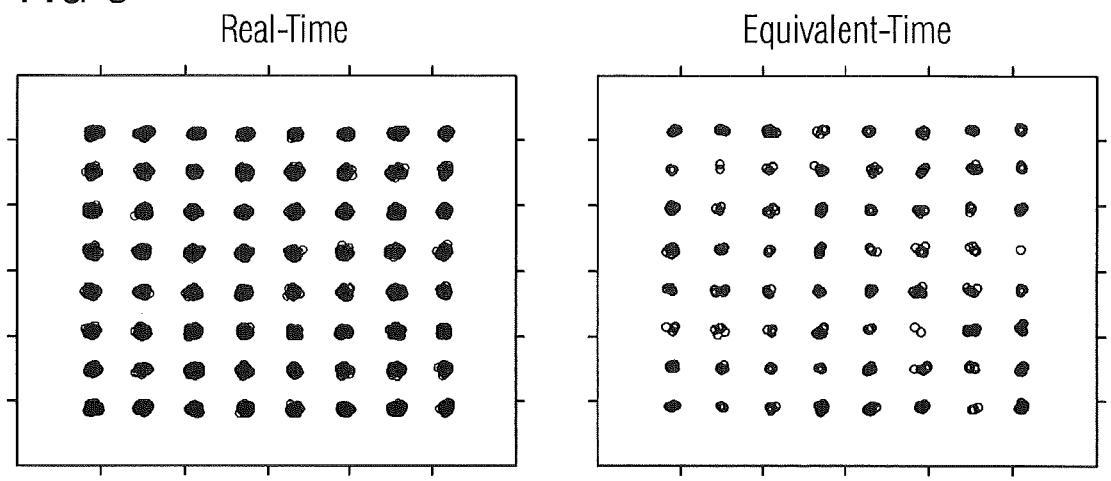
FIGS. 8, 9 show diagrams for illustrating equivalent-time sampling in a possible exemplary embodiment of the apparatus and method according to the present invention.
Figure 9:
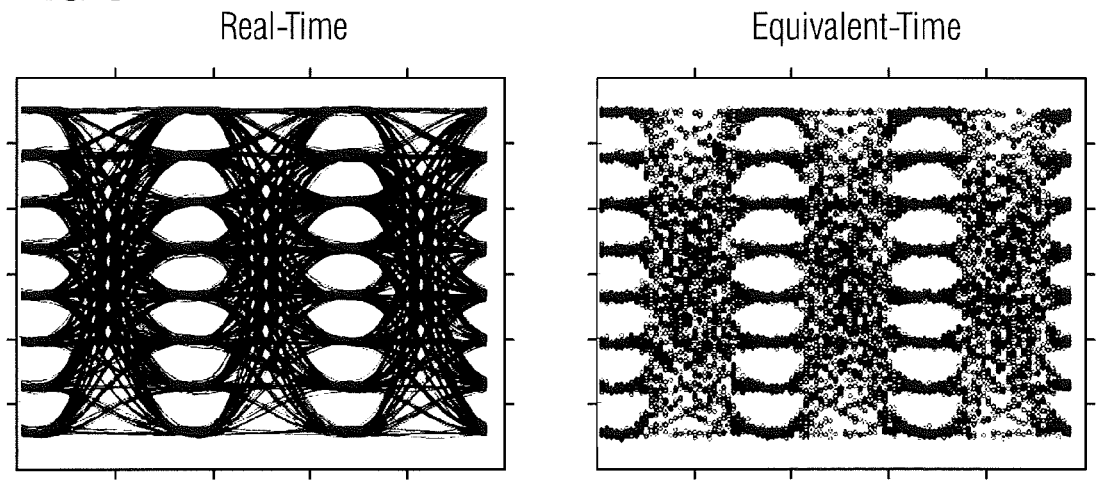

Constellation and eye diagrams of a PDM-64QAM signal are shown in FIGS. 8, 9 to demonstrate the viability of applying equivalent-time sampling. FIG. 8 shows constellation diagrams of a PDM-64QAM signal for real-time sampling and equivalent-time sampling. As can be seen from FIG. 8, the equivalent-time sampling does not negatively affect the constellation diagram of the PDM-64QAM signal. FIG. 9 shows the signal eye diagrams when applying equivalent-time sampling and for real-time sampling. Again, it is demonstrated that applying equivalent-time sampling does not affect the signal eye diagrams negatively. In the shown simulations of FIGS. 8, 9, a 32 GBaud PDM-64QAM signal has been detected using 3.2-Gsample/sec analog-to-digital converters employing the equivalent-time sampling concept used by the analog-digital converter stage 6B of the monitoring circuit 6. With equivalent-time sampling ET, a picture of the input signal is constructed by accumulating the samples over many wave cycles. Equivalent-time sampling requires lower-speed electronic components. It offers a higher bandwidth and a higher vertical resolution which means a better signal characterization.

Figure 4:
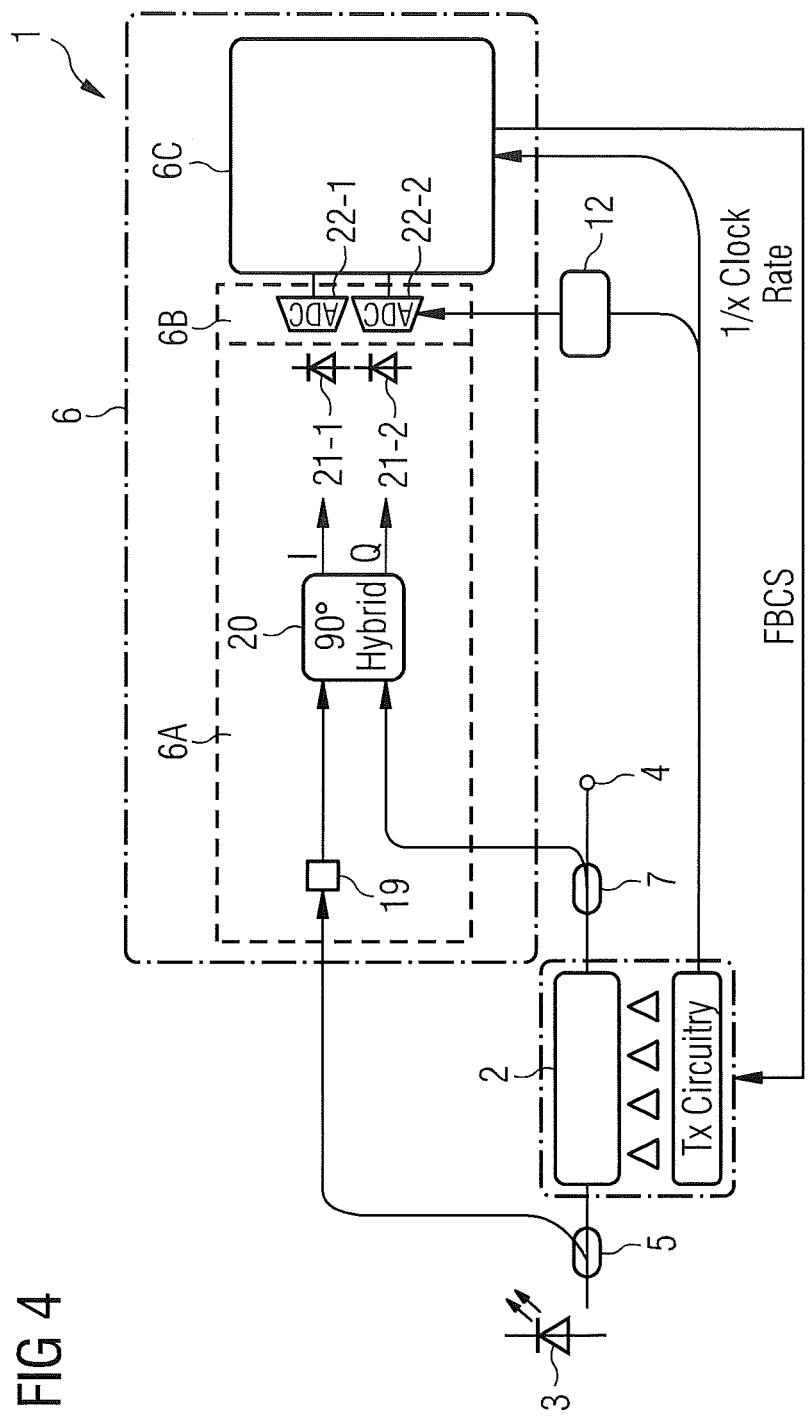
FIG. 4 shows a block diagram for illustrating a further possible embodiment of a transmitter according to the first aspect of the present invention.

FIG. 3 shows a first variant of the monitoring circuit 6 having an optical front end 6A with two polarization beam splitters 8-1, 8-2, two 90-degree hybrid couplers 9-1, 9-2 and four photo detection diodes 10-1, 10-2, 10-3, 10-4. FIG. 4 shows a further variant of the monitoring circuit 6 employing the optical front end 6A with a simplified structure. In the shown embodiment, the unmodulated optical signal tapped by the polarization maintaining coupler 5 is supplied as a reference signal to a polarization rotator 19 of the optical front end 6A configured to rotate the polarization axis of the tapped unmodulated optical signal by either 0 or 90 degrees. The polarization rotator 19 is an optical device that rotates the polarization axis of a linearly polarized light beam by an angle of choice. The polarization rotator 19 can comprise mechanical parts rotating an optical signal by a predetermined angle. In a possible embodiment, a double Fresnel rhomb rotates the linear polarization axis by 0 or 90 degrees. In an alternative embodiment, a broadband prismatic rotator rotates the linear polarization. The rotated tapped unmodulated optical signal output by the polarization rotator 19 is supplied to a first input of a 90-degree hybrid coupler 20 and the tapped modulated optical signal output by the second polarization maintaining coupler 7 is supplied to a second input of the 90-degree hybrid coupler 20 as shown in FIG. 4. The 90-degree hybrid coupler 20 of the optical front end 6A is adapted to output an in-phase signal component I and a quadrature signal component Q in a selected polarization state to two photo detectors 21-1, 21-2 which convert the optical signals to analog electrical signals applied to two corresponding analog-to-digital converters 22-1, 22-2 of the analog-digital converter stage 6B of the monitoring circuit 6. The digital output signals of the analog-to-digital converters 22-1, 22-2 are supplied to a processing unit 6C of the monitoring circuit 6 employing a low-speed digital signal processor DSP. In the embodiment shown in FIG. 4, the optical front end 6A requires less components than the optical front end 6A in the embodiment of FIG. 3. In the embodiment of FIG. 4, only one signal polarization is selected at a time. First, a signal with polarization X is detected. The state of polarization is then flipped by rotating the polarization of the reference to detect a signal with polarization Y. This is possible since the X and Y polarizations are preserved using polarization maintaining components. In the embodiment shown in FIG. 4, the size of the optical front end 6A can be reduced by half compared to the embodiment shown in FIG. 3.

The configuration of FIG. 4 comprises a polarization rotator 19 which flips the polarization state of the reference signal by either 0 or 90 degrees. When flipped by 0, the reference signal enables the receiver from extracting the H polarization of the modulated signal which will be passed to the analog domain and then to the equivalent-time sampling ADCs.

After processing the H polarization and calculating the pre-distortion function and correction parameters, the polarization rotator 19 flips the polarization state of the reference signal by 90 degrees to select the V signal component and repeats the same process that took place on the H polarization.

The configuration of FIG. 4 is a simplification to the configuration of FIG. 3. It reduces the number of required optical and RF components by half by reusing the same components for both the H and V polarizations.

In order for the configuration of FIG. 4 to monitor both the H and V polarizations, it can work in some kind of time-division, i.e. first processing the H polarization, then change the optics to select the V polarization and processing the V polarization.

In other embodiments other types of optical coherent receivers can be used. For instance the 90-degree hybrid couplers can be replaced by 120-degree hybrid couplers.

Figure 5:
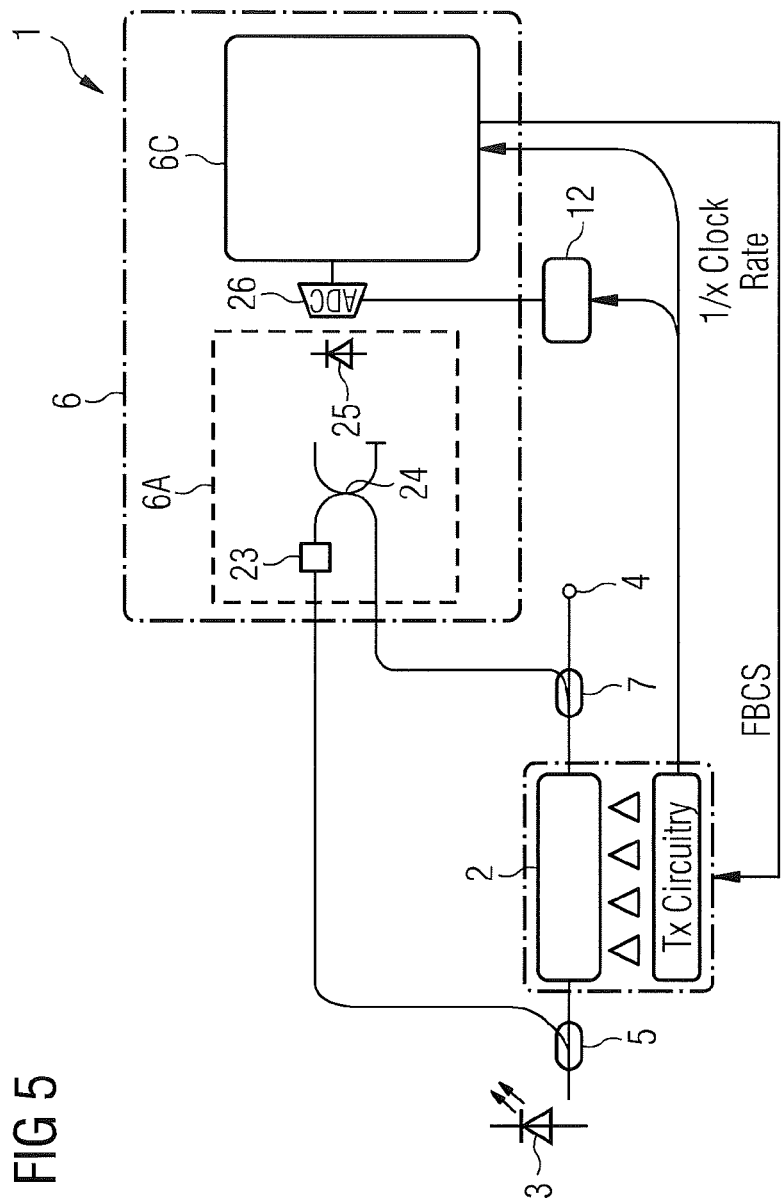
FIG. 5 shows a block diagram for illustrating a further possible exemplary embodiment of a transmitter according to the first aspect of the present invention.

FIG. 5 shows a further exemplary embodiment of a transmitter 1 according to the first aspect of the present invention with an even further simplified structure of the optical front end 6A of its monitoring circuit 6. In the embodiment of FIG. 5, the optical front end 6A comprises a polarization rotator and phase shifter 23 which is configured to rotate the polarization axis of the tapped unmodulated signals by either 0 degrees or 90 degrees. The rotator 23 is configured to detect one polarization at a time. Further, the phase of the reference signal can be shifted by 90 degrees to detect either the in-phase I or quadrature signal components Q. Four states of the signal are scanned to detect XI, XQ, YI and YQ one at a time. Accordingly, the optical front end 6A scans through four different states (phase and polarization states) to select different polarizations and in-phase or quadrature signal components of the received signal. In the embodiment shown in FIG. 5, the optical front end 6A comprises the polarization rotator and phase shifter 23 and an optical coupler 24 which is adapted to mix the rotated optical signal with the modulated optical signal tapped by the second polarization maintaining coupler 7 and is supplied to a single photo detector 25 of the optical front end 6A converting the mixed optical signal to an analog electrical signal applied to a single analog-to-digital converter 26 forming the analog converter stage 6B of the monitoring circuit 6, wherein the analog-to-digital converter 26 is adapted to perform equivalent-time sampling of the received analog signal to provide a corresponding digital signal processed by the processing unit 6C of the monitoring circuit 6. The advantage of the embodiment shown in FIG. 5 is the use of a simplified optical front end 6A which only requires implementing a single analog-to-digital converter 26 and single photodetector 25.

The component 23 is supposed to flip the polarization state back and forth between 0 and 90 degrees, and in the same time shifts the optical phase of this reference signal by 0 or 90 degrees. Consequently, the component 23 can configure the reference signal to scan four different states:

| Polarization | phase |
|---|---|
| 0 | 0 |
| 0 | 90 |
| 90 | 0 |
| 90 | 90 |

Accordingly, the reference signal can select one of the four signal components of the modulated signal at a time: VI, VQ, HI or HQ.

At each setting for the phase and polarization of the reference signal one signal component is extracted from the modulated signal, converted to analog domain and finally to the digital domain. After calculating the pre-distortion function/correction parameters for that signal component, the polarization state and/or optical phase of the reference signal changes to select the next signal component and so on. This technique further simplifies the setup of the monitoring circuit by reusing the same RF and optical components for the detection of the different signal components.

In the embodiment of FIG. 4 it is possible to scan two states (select either polarization X or Y). In the embodiment of FIG. 5 it is possible to scan four states by selecting either polarization X or Y (by rotating the polarization) and selecting either signal components I or Q (by shifting the optical phase).

Although optical coherent receivers are mainly implemented using 90 degree hybrids, other techniques can be used as well such as 120 degree hybrids.

Figure 6:
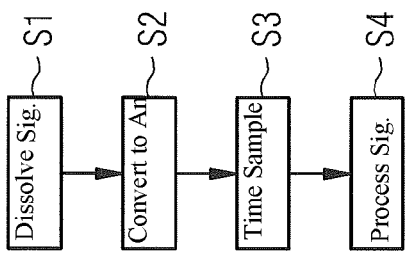
FIG. 6 shows a flow diagram for illustrating a possible exemplary embodiment of the method according to the second aspect of the present invention.

FIG. 6 shows a flow chart illustrating a possible exemplary embodiment of a method for monitoring a signal quality of a modulated optical signal according to a second aspect of the present invention.

In a first step S1, optical signal components of the modulated optical signal are dissolved. The dissolving of the optical signal components of the modulated optical signal can be performed for example by an optical front end 6A as illustrated in the embodiments of FIGS. 3, 4, 5. A feedback circuit keeps switching continuously over time between different signal components to extract and characterize them.

In a further step S2, the dissolved optical signal components are converted into electrical analog signals. This can be performed by means of optical detectors or photo diodes within an optical front end.

In a further step S3, equivalent-time sampling of the generated analog signals is performed to provide corresponding low-rate digital signals. The equivalent-time sampling in step S3 can be performed by analog-to-digital converters of the ADC converting stage 6B as illustrated in the embodiments of FIGS. 3, 4, 5.

Finally, the low-rate digital signals are processed in step S4 to monitor the signal quality of the modulated optical signal.

In a further optional step not illustrated in FIG. 6, an optimal pre-distortion function is calculated and corresponding feedback control signals FBCS are supplied to adjust driving signals of the optical modulator 2 according to the calculated pre-distortion functions.

In a further possible step, signal quality parameters of the modulated optical signal can be reported to a remote central control unit for further evaluation.

One aspect of the present invention is that one can share the same optical components to dissolve the optical signal. This way one has a time-division configuration to characterize different signal components at different time instances using the same hardware.

The method illustrated in FIG. 6 can be performed by a program run by a microprocessor of a monitoring circuit 6 attached to or integrated in an optical transmitter 1. With the method and apparatus according to the present invention, it is possible to generate an accurate and continuous feedback on the signal quality of the transmitted optical signal regardless of its modulation format. This feedback control signal FBCS can be used for the adaption of RF driving signals which are applied to the optical modulator 2 to reduce implementation penalties for high-order and high-speed optical modulation formats. Furthermore, the feedback control signal FBCS can reduce the dependency of the signal quality on the variations in temperature or other environmental effects and the effects of aging of the transmitter components. The proposed setup has several advantages, besides the simplicity of implementation. The low-speed analog-to-digital converters ADCs that are employed for equivalent-time sampling do guarantee a more accurate characterization of the optical signal due to their higher vertical resolution compared to full-speed analog-to-digital converters satisfying the Nyquist criterion. Furthermore, the proximity of the monitoring circuit 6 to the optical modulator 2 reduces any delays in sending the feedback control signal to the transmitter 1 compared to a feedback coming from a receiver side on the remote end of a transmission link and removes link impairments from the feedback. Besides, the reduction in implementation penalties for high-order modulation formats, the pre-distortion optimization offered by the monitoring circuit 6 allows for an increase in the amplitudes of the RF driving signals which will consequently guarantee a higher optical output power of the optical signal output by the transmitter 1. The method and apparatus according to the present invention can continuously monitor the performance of the optical transmitter 1 over its lifetime. It employs low-cost complexity circuitry to characterize the quality of the signal. Furthermore, it employs low-speed processing by a low-speed digital signal processor DSP to determine the best or optimal pre-distortion functions that can be applied to the transmitter 1. This pre-distortion can compensate for the bandwidth limitations of the transmitter components and their nonlinear transfer functions. The pre-distortion function calculated by the monitoring circuit 6 can be continuously adjusted to take into account any effects from temperature, aging or any other time-dependent variations to the characteristics of the transmitter 1. The monitoring circuit 6 is adapted to correct for suboptimal settings of the DC biasing points of the optical modulator, correct for IQ-imbalances and/or calculate the pre-distortion functions to compensate the impairments resulting from non-ideal, nonlinear components within the transmitter. In a possible embodiment, the monitoring circuit 6 can report to a user some parameters related to the signal quality of the transmitted optical signal, such as SNR, Q-factor or EVM. In this way, a useful troubleshooting tool is provided for a network operator.

The invention claimed is:

1. A transmitter with at least one optical modulator adapted to modulate the optical signal output by a laser source to generate a modulated optical signal, wherein the optical signal output by the laser source is tapped and supplied to a monitoring circuit, comprising:
    an optical front end configured to select signal components of a tapped modulated optical signal, via optical coherent detection, and to convert the selected signal components of the tapped modulated optical signal into analog signals; and
    at least one analog-to-digital converter (ADC) adapted to perform equivalent-time sampling of the analog signals to provide digital signals to be processed by a processing unit to monitor signal quality of the modulated optical signal,
    wherein the unmodulated optical signal output by the laser source is tapped by a first polarization maintaining coupler and supplied as a reference signal to the optical front end of the monitoring circuit,
    wherein the modulated optical signal output by the optical modulator is tapped by a second polarization maintaining coupler and supplied to the optical front end of the monitoring circuit, and
    wherein the unmodulated optical signal tapped by the first polarization maintaining coupler is supplied as a reference signal to a first polarization beam splitter of the optical front end, and the modulated optical signal tapped by the second polarization maintaining coupler is supplied to a second polarization beam splitter of the optical front end.

2. The transmitter according to claim 1, wherein the optical modulator is configured to modulate an amplitude and/or a phase and/or a polarization of the optical signal output by said laser source to generate the modulated optical signal output by said transmitter.

3. The transmitter according to claim 1, wherein the processing unit of said monitoring circuit comprises a digital signal processor, DSP, adapted to calculate a pre-distortion function and/or correction parameters to be used by the transmitter to compensate for nonlinear transfer functions and/or bandwidth limitations of transmitter components.

4. The transmitter according to claim 3, wherein the monitoring circuit supplies a feedback control signal to adjust driving signals applied to the optical modulator according to the calculated pre-distortion function and/or correction parameters.

5. The transmitter according to claim 3, wherein the calculated optimal pre-distortion function and/or correction parameters are continuously adjusted by the monitoring circuit to compensate changes of characteristics of transmitter components due to time-dependent variations of operation parameters and/or aging of transmitter components.

6. The transmitter according to claim 1, wherein: a first split signal output by the first polarization beam splitter is supplied to a first input of a first 90-degree hybrid coupler of the optical front end and a second split signal output by the first polarization beam splitter is supplied to a second input of a second 90-degree hybrid coupler of the optical front end, and a first split signal output by the second polarization beam splitter is supplied to a second input of the first 90-degree hybrid coupler of the optical front end and the second split signal output by the second polarization beam splitter is supplied to a first input of the second 90-degree hybrid coupler of the optical front end.

7. The transmitter according to claim 6, wherein: the first 90-degree hybrid coupler of the optical front end outputs an in-phase signal component and a quadrature signal component in a first polarization state to two photo detectors converting both optical signal components into corresponding analog signals, and the second 90-degree hybrid coupler of the optical front end outputs an in-phase signal component and a quadrature signal component in a second polarization state to two photo detectors converting both optical signal components into corresponding analog signals.

8. The transmitter according to claim 7, wherein the analog signals provided by the four photo detectors of the optical front end are applied to four analog-to-digital converters adapted to perform equivalent time sampling of the received analog signals to provide digital signals processed by the processing unit of the monitoring circuit.

9. The transmitter according to claim 1, wherein the unmodulated optical signal tapped by the first polarization maintaining coupler is supplied as a reference signal to a polarization rotator of the optical front end configured to either not rotate the polarization axis of the tapped unmodulated optical signal or to rotate said axis by 90 degrees.

10. The transmitter according to claim 9, wherein:
    the at least one analog-to-digital converter includes two analog-to-digital converters; and the rotated or un-rotated tapped unmodulated optical signal output by the polarization rotator is supplied to a first input of a 90-degree hybrid coupler of the optical front end and the tapped modulated optical signal output by a second polarization maintaining coupler is supplied to a second input of said 90-degree hybrid coupler which outputs an in-phase signal component and a quadrature signal component in a selected polarization state to two photo detectors converting the optical signals to analog signals applied to the two analog-to-digital converters, said two analog-to-digital converters adapted to perform equivalent-time sampling of the received analog signals to provide digital signals processed by the processing unit of the monitoring circuit.

11. The transmitter according to claim 1, wherein the unmodulated optical signal tapped by the first polarization maintaining coupler is supplied as a reference signal to a polarization rotator of the optical front end configured to either not rotate the polarization axis of the tapped unmodulated optical signal or to rotate said axis by 90 degrees and to shift simultaneously the optical phase of the tapped unmodulated optical signal by either 0 degrees or 90 degrees.

12. The transmitter according to claim 11, wherein the rotated or un-rotated unmodulated optical signal output by the polarization rotator is mixed by means of an optical coupler with the modulated optical signal tapped by a second polarization maintaining coupler and supplied to a single photo detector of the optical front end converting the mixed optical signal to an analog signal applied to a single analog-to-digital converter adapted to perform equivalent-time sampling of the received analog signal to provide a corresponding digital signal processed by the processing unit of the monitoring circuit.

13. The transmitter according to claim 1, wherein the processing unit is configured to construct a transfer function of the transmitter used to calculate a pre-distortion function to be used by the transmitter.

14. The transmitter according to claim 1, wherein the monitoring circuit comprises an interface to report parameters related to the monitored signal quality of the modulated optical signal output by the transmitter to a network operator.

15. The transmitter according to claim 1, wherein the optical modulator comprises at least one Mach-Zehnder modulator MZM.

16. The transmitter according to claim 1, wherein the modulated optical signal output by the transmitter is an optical polarization division multiplexed, PDM, quadrature amplitude modulation, QAM, signal.

17. The transmitter according to claim 1, wherein the modulated optical signal output by the transmitter comprises a data rate of more than 25 Gigabit/sec.

18. An optical communication system including at least one transmitter according to claim 1 for transmitting a modulated optical signal via an optical transport medium to a receiver.

* * * * *